United States Patent [19]
Erard

[11] 3,807,790
[45] Apr. 30, 1974

[54] REAR SEAT DEVICE FOR A VEHICLE HAVING MULTIPLE USES

[75] Inventor: Robert Erard, Exincourt, France

[73] Assignees: Automobiles Peugeot, Paris; Regie Nationale des Usines Renault, Billancourt, both of, France

[22] Filed: May 15, 1972

[21] Appl. No.: 253,258

[30] Foreign Application Priority Data
July 19, 1971 France .............................. 71.26371

[52] U.S. Cl. .................. 296/66, 297/331, 297/379
[51] Int. Cl. ............................................. B60n 1/10
[58] Field of Search ...... 296/65 R, 66, 69; 297/124, 297/125, 63, 331, 379

[56] References Cited
UNITED STATES PATENTS

| | | | |
|---|---|---|---|
| 2,140,968 | 12/1938 | Paranzino | 296/65 R X |
| 2,956,837 | 10/1960 | Koplin | 296/66 |
| 3,202,453 | 8/1965 | Richards | 296/66 |
| 1,894,103 | 1/1933 | Kuenzel | 296/69 X |
| 2,136,972 | 11/1938 | Graunke | 296/65 R X |
| 2,347,025 | 4/1944 | Benzick | 296/69 X |
| 1,792,737 | 2/1931 | Greenstreet | 297/124 |

FOREIGN PATENTS OR APPLICATIONS

| | | | |
|---|---|---|---|
| 124,255 | 3/1919 | Great Britain | 296/66 |

Primary Examiner—David Schonberg
Assistant Examiner—Leslie J. Paperner
Attorney, Agent, or Firm—Burns, Doane, Swecker & Mathis

[57] ABSTRACT

Rear seat device for a multi-purpose vehicle having a rear shelf. The device comprises a seat squab and a backrest having an upper part substantially on the level of the rear shelf in the normal position of utilization. Guide, pivoting and locking means are adapted to lock the backrest in a first and normal position of utilization and guide the backrest to a second position in which the backrest rests on the rear shelf, the squab being moved out of the way so as to afford a larger luggage loading area.

10 Claims, 4 Drawing Figures

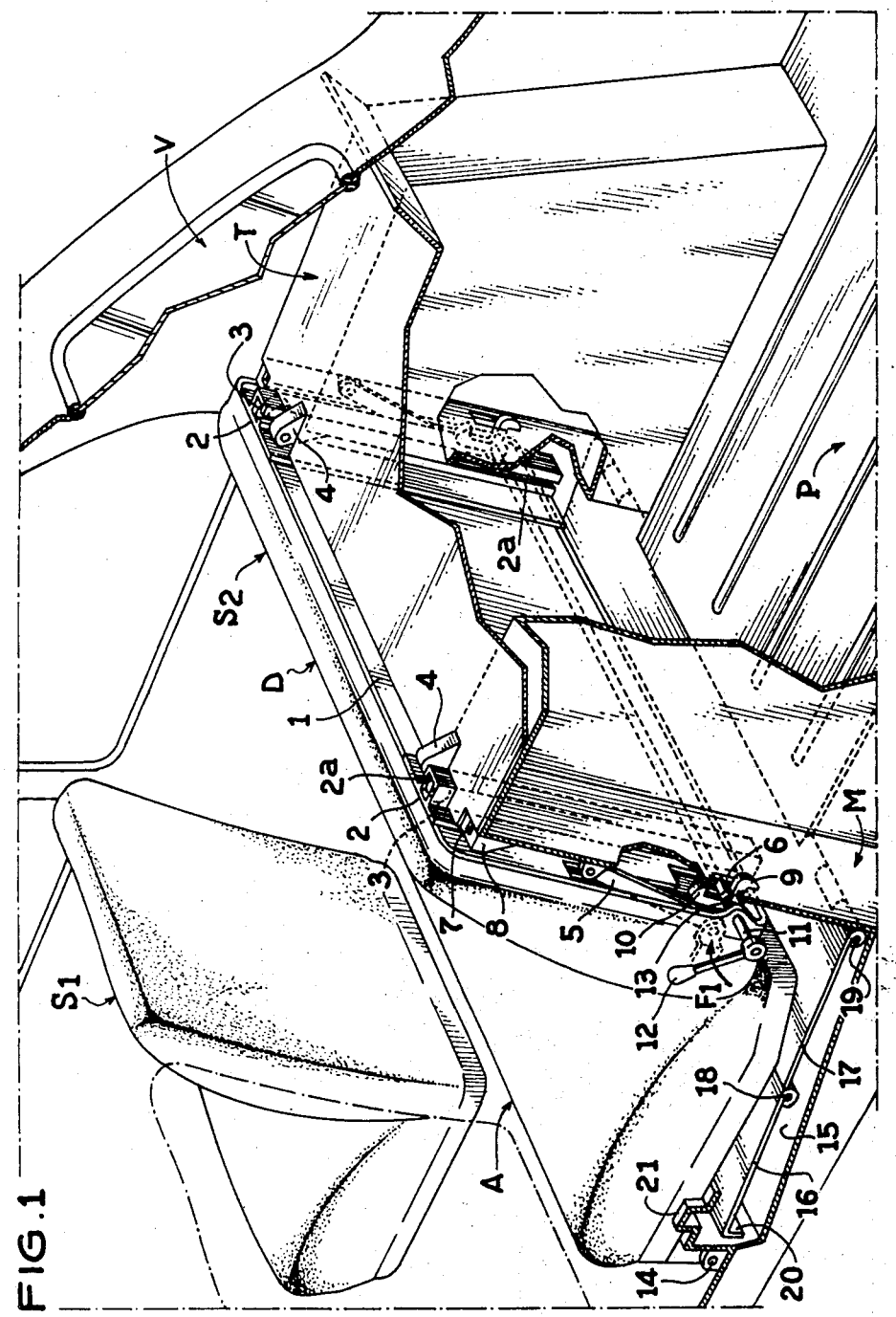

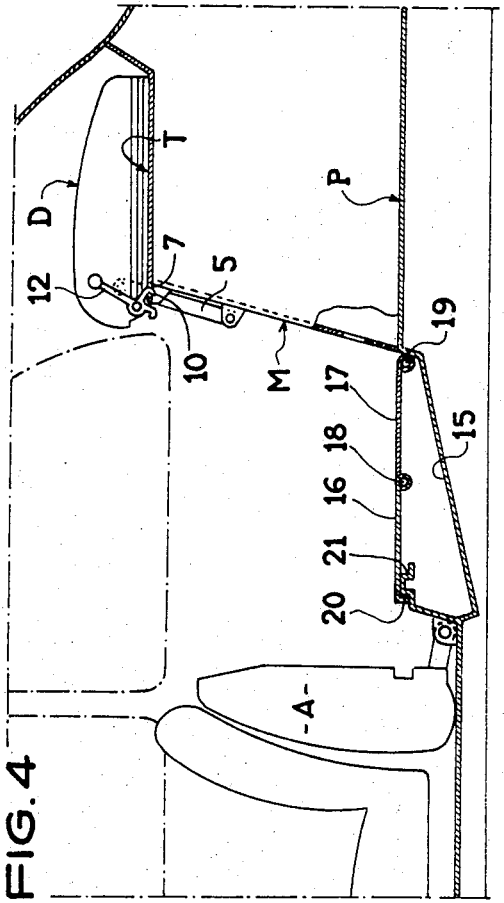
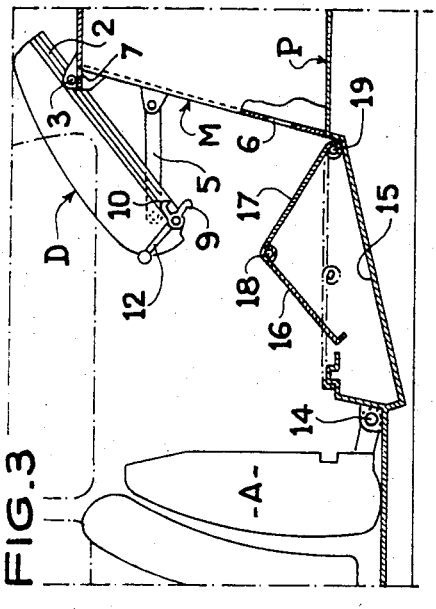
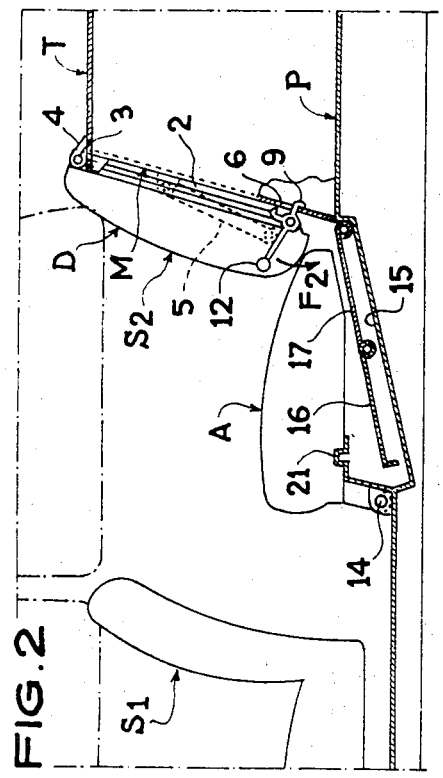

REAR SEAT DEVICE FOR A VEHICLE HAVING MULTIPLE USES

The present invention relates to vehicles which may be employed either as a private car or as a utility or estate vehicle owing to a special arrangement of the rear seat.

Rear seat devices are known which permit such a conversion. In particular, U.S. Pat. No. 3,550,949 filed by the Applicants discloses an arrangement which, after unlocking, the squab of the rear seat can be folded forward and disposed along the backrest of the front seats, whereas the backrest of the rear seat can be folded so as to occupy the space left by the squab and thus constitute an extension of the loading area of the rear luggage compartment. Such an arrangement implies that the difference between the levels of the floor of the luggage compartment and the floor of the part left by the seat is sufficient to accomodate the backrest when the latter is folded forward.

Another device is known in which the backrest is merely mounted on the body of the vehicle to pivot about an axis located in the vicinity of its upper part so that, after tilting about this axis, the backrest occupies a roughly horizontal position across the openings of the rear side doors—which hinders the loading and consequently presents a serious drawback.

An object of the present invention is to provide a rear seat device which permits considerably increasing the loading area and volume — even if the difference of level between the floor of the luggage compartment and the floor under the seat is relatively small and in any case insufficient to allow the aforementioned first arrangement — and leaving completely free the opening of the rear side doors so as to allow an easy loading.

This result is obtained by means of a rear seat device comprising a squab and a backrest whose upper part is roughly on the level of a rear shelf, wherein guide, pivoting and locking means are provided between the backrest and the adjacent relatively fixed part of the vehicle so that, in a first position, the backrest is locked in the normal position of utilisation and, in a second position, the backrest bears against the rear shelf, whereas the squab is moved out of the way in the known manner so as to leave a larger loading area or surface.

In a preferred embodiment, the guide means comprise slideways and rollers respectively carried by the backrest and by a fixed part of the vehicle, the pivoting means comprise two links respectively pivoted to the backrest and to said fixed part and the locking means are adapted to lock the backrest in either of its two positions, the locking of the squab in the normal position of utilisation being achieved by an overlapping of the rear part of the squab by the lower part of the backrest.

Further features and advantages of the invention will be apparent from the ensuing description with reference to the accompanying drawings.

In the drawings:

FIG. 1 is a perspective view, with a part cut away, of the rear part of the multi-use vehicle according to the invention, and FIGS. 2, 3 and 4 are diagrammatic side elevational views of the rear seat device in three positions.

As can be seen in FIG. 1, the rear part of a multi-use vehicle V includes essentially a front seat $S_1$, a rear seat $S_2$ and a part of the floor P of the luggage compartment and wheel arches, the front part of which arches constitute two uprights M. The rear seat essentially comprises a seat proper or squab A and a backrest D the upper part of the backrest being roughly on the same level as a rear shelf or platform T.

There will now be described in more detail the device which constitutes the object of the invention: the backrest D of the seat comprises on its roughly plane rear face 1 two slideways 2 each of which has a slot 2a which faces the interior of the vehicle and in which are received rollers or blocks 3 pivoted to bosses 4 integral with the shelf T and the uprights M. These slideways and these rollers consititute guide means for the backrest with respect to the fixed part of the body of the vehicle.

Links 5 are pivoted to the lower part of the backrest and to the uprights M.

Locking means are also provided and comprise fixed parts constituted by two roughly vertical keepers 6 formed in the uprights M and two horizontal keepers 7 formed in members 8 provided in the upper part of the uprights. The movable locking means carried by the backrest comprise two double hooks 9, 10 adapted to cooperate respectively with the two pairs of keepers 6, 7. These two double hooks are carried by a rod 11 which carries at one end an actuating lever 12 and is pivotably mounted on the backrest. Resiliently yieldable return means, for example a spring 13, is provided for biasing the assembly consisting of the rod 11, the lever 12 and the hooks 9, 10 in the direction of arrow $F_1$, that is, to the locking position.

The squab A is mounted in its front part to pivot about a pivot pin 14 and there is provided under this squab a cavity 15 in which is received a floor element consisting of two parts 16, 17 which are pivoted together by a pin 8 and pivoted to the floor by a pin 19, the front part having a flange 20 adapted to engage a projecting portion 21 on the floor.

The operation of this device will now be described with reference to FIGS. 2, 3 and 4. In the position shown in FIG. 2, the squab A and the backrest D constitute a rear seat which may be employed by the passengers and practically does not differ from a conventional rear seat. In this position, the backrest is locked by the fact that the hooks 9 are engaged with the keepers 6, the rollers 3 being in the upper part of the backrest which is thus held in position at four points. The links 5 prevent any vertical displacement of the backrest and consequently any undesired unlocking. The squab is locked in position owing to the overlapping of its rear part by the lower part of the backrest D. Owing to this last mentioned arrangement, the comfort is also improved. The folding floor 16, 17 is stored under the squab.

If it is desired to convert the vehicle into an estate, utility or semi-utility vehicle having an increased loading area and volume, it is sufficient to swing the lever 12 in the direction of arrow $F_2$ so as to disengage the hooks from their keepers and thus unlock the backrest D. When this has been done, it is sufficient to raise the backrest and cause it to swing upwardly and rearwardly, the slideways 2 travelling along the rollers 3 and the links 5 guiding this movement (FIG. 3). The squab can then be swung forward as shown in FIG. 3 and the floor elements 16, 17 can be disengaged from their cavity.

In FIG. 4 the backrest is shown in its second position resting against the rear shelf T, the links 5 being then disposed along the uprights M and the hooks 10 being engaged in the upper keepers 7. FIG. 4 also shows that the pivoted floor elements complete the floor of the luggage compartment so as to provide a roughly plane and horizontal loading platform. The pivotal connection 18 is open to its maximum extend at 180° so as to afford the desired plane floor.

To put the rear seat in the normal position of use, the squab is returned to its normal position, the hooks 10 are disengaged from the upper keepers 7 and the backrest is lowered, the links 5 ensuring the correct presentation of the hooks 9 with respect to the keepers 6.

It will be clear that the objects of the invention are attained, since the loading area and volume are considerably increased with respect to the touring or passenger vehicle configuration and that, in contradistinction to what occurs with known devices, the available volume under the seat and the difference in level between the floor of the luggage compartment and the floor under the seat can be reduced as shown in the drawings. In the withdrawn position, the backrest in no way hinders access by way of the rear side doors. Further, the locking in the two positions is very efficient — in particular in the seat position in which mere pressure exerted on the backrest engages the hooks 9 in their keepers and in which the backrest is held at four points, namely two in the upper part and two in the lower part of the backrest.

The means employed are very simple and in particular it will be observed that the same control elements 11 and 12 are employed for unlocking in the two positions.

A certain number of modifications, not shown, may be made. First, the folding floor 16, 17, which is optional, can be disposed behind the backrest instead of being received under the seat. Further, the squab may be pivoted to the backrest instead of being pivoted to the floor and foldable forwardly. The squab may be provided in the known manner with separate locking means. It must be understood that the dimensions of the backrest are such that a sufficient area of the rear window remains unmasked and makes the region at the rear of the vehicle visible to the driver.

Having now described my invention what I claim as new and desire to secure by Letters Patent is:

1. A rear seat device for a multi-use vehicle having a passenger compartment, a luggage compartment at the rear of the passenger compartment, a rear shelf extending over at least a part of the luggage compartment and having a front end part and a rear end part, and a fixed part of the vehicle, the device comprising a squab, a backrest, the backrest having a bottom end part adjacent the squab in a first position of the backrest corresponding to a normal position of utilization of the backrest and a top end part substantially adjacent said front end part of the rear shelf in said first position, and guide means, pivoting means and locking means interposed between and combined with the backrest and the fixed part of the vehicle so as to selectively lock the backrest in said first position and guide the backrest to a second position in which the backrest rests on the rear shelf with said bottom end part of the backrest substantially adjacent said front end part of the rear shelf and said top end part of the backrest substantially adjacent said rear end part of the rear shelf, the squab being movable to a withdrawn position, whereby the luggage compartment can be extended into the passenger compartment, the locking means comprising at least one locking member which defines two angularly offset hooks and is pivoted to the backrest, an actuating lever integral with the locking member, two keepers carried by the fixed part of the body of the vehicle and respectively hookable by the two hooks, each assembly consisting of a hook and a keeper serving to lock the backrest in one of said two positions.

2. A rear seat device for a multi-use vehicle having a passenger compartment, a luggage compartment at the rear of the passenger compartment, a rear shelf extending over at least a part of the luggage compartment and having a front end part and a rear end part, and a fixed part of the vehicle, the device comprising a squab, a backrest, the backrest having a bottom end part adjacent the squab in a first position of the backrest corresponding to a normal position of utilization of the backrest and a top end part substantially adjacent said front end part of the rear shelf in said first position, and guide means, pivoting means and locking means interposed between and combined with the backrest and the fixed part of the vehicle so as to selectively lock the backrest in said first position and guide the backrest to a second position in which the backrest rests on the rear shelf with said bottom end part of the backrest substantially adjacent said front end part of the rear shelf and said top end part of the backrest substantially adjacent said rear end part of the rear shelf, the squab being movable to a withdrawn position, whereby the luggage compartment can be extended into the passenger compartment.

3. A device as claimed in claim 2, wherein the backrest has a rear face which is adjacent the luggage compartment in the first position of the backrest and extends alongside the rear shelf in said second position of the backrest and the guide means comprise slideways and rollers respectively carried by the backrest adjacent said rear face and by the fixed part of the vehicle, the pivoting means comprise two links pivoted to the backrest and to the fixed part of the vehicle and the locking means are adapted to lock the backrest in either of said two positions, the links being pivotable about their pivotal connection to the fixed part of the vehicle between a first position and a second position respectively corresponding to said first position and second position of the backrest, the locking of the squab in the normal position of use of the seat being achieved by the overlapping of a rear part of the squab by the bottom end part of the backrest.

4. A device as claimed in claim 2, wherein the guide means comprise two slideways carried by the backrest and two members carried by the fixed part of the vehicle in the vicinity of said front end part of the rear shelf and respectively engaged in the slideways.

5. A device as claimed in claim 2, wherein the guide means comprise slideways and rollers respectively carried by the backrest and by the fixed part of the vehicle, the pivoting means comprise two links pivoted to the backrest and to the fixed part of the vehicle and the locking means are adapted to lock the backrest in either of said two positions, the locking of the squab in the normal position of use of the seat being achieved by the overlapping of the rear part of the squab by the lower part of the backrest, the links having one end pivoted to the backrest in said bottom end part and another end pivoted to the fixed part of the vehicle, said links making a relatively small angle with the vertical when the backrest is in said first position and precluding any upward displacement of the backrest.

6. A device as claimed in claim 2, wherein the squab is mounted on the vehicle to be pivotable about a transverse axis adjacent a front part of the squab to a position in which the squab lies along side a front seat of the vehicle.

7. A device as claimed in claim 2, wherein the squab is pivoted to the backrest and is capable of being folded against the backrest when the backrest is brought to said second position.

8. A multi-use vehicle comprising a passenger compartment, a luggage compartment at the rear of the passenger compartment, a rear shelf extending over at least a part of the luggage compartment and having a front end part and a rear end part, a fixed part of the vehicle, and a rear seat device which comprises a squab, a backrest, the backrest having a bottom end part adjacent the squab in a first position of the backrest corresponding to a normal position of utilization of the backrest and a top end part substantially adjacent said front end part of the rear shelf in said first position, and guide means, pivoting means and locking means interposed between and combined with the backrest and the fixed part of the vehicle so as to selectively lock the backrest in said first position and guide the backrest to a second position in which the backrest rests on the rear shelf with said bottom end part of the backrest substantially adjacent said front end part of the rear shelf and said top end part of the backrest substantially adjacent said rear end part of the rear shelf, the squab being movable to a withdrawn position, whereby the luggage compartment can be extended into the passenger compartment.

9. A vehicle as claimed in claim 8, comprising under the squab a compartment which is closed by the squab in the normal position of utilization of the squab, and a foldable floor located in the compartment under the squab and adapted to complete a loading floor in the luggage compartment.

10. A vehicle as claimed in claim 8, comprising a foldable element which is foldable behind the backrest when the backrest is in said first position of the backrest.

* * * * *